(12) United States Patent
Hsia et al.

(10) Patent No.: US 8,979,299 B2
(45) Date of Patent: Mar. 17, 2015

(54) LINEAR SOLID-STATE LIGHTING WITH READILY RETROFITTABLE MODULAR STRUCTURE

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 152 days.

(21) Appl. No.: 13/896,325

(22) Filed: May 17, 2013

(65) Prior Publication Data

US 2014/0340884 A1    Nov. 20, 2014

(51) Int. Cl.
| | |
|---|---|
| *F21S 4/00* | (2006.01) |
| *F21V 23/02* | (2006.01) |
| *F21V 23/00* | (2006.01) |
| *F21K 99/00* | (2010.01) |

(52) U.S. Cl.
CPC .............. *F21V 23/009* (2013.01); *F21K 9/17* (2013.01); *F21K 9/175* (2013.01); *Y02B 20/386* (2013.01); *Y10S 362/80* (2013.01)
USPC .................. 362/221; 362/217.13; 362/217.17; 362/225; 362/249.02; 362/800

(58) Field of Classification Search
CPC ....... F21V 21/005; F21V 23/009; F21K 9/17; F21K 9/175; Y02B 20/386
USPC ........... 362/217.01, 217.1–217.17, 221, 225, 362/249.02, 800
See application file for complete search history.

(56) References Cited

U.S. PATENT DOCUMENTS

2012/0306342 A1* 12/2012 Dellian et al. ................. 313/46

* cited by examiner

*Primary Examiner* — Jason Moon Han
(74) *Attorney, Agent, or Firm* — Han IP Corporation

(57) ABSTRACT

A linear light-emitting diode (LED) tube lamp having a readily retrofittable modular structure enables consumers or manufacturers to readily retrofit the lamp by replacing an LED module or internal electronic control units that include an LED driver in maintenance or lamp upgrade without hazards. The readily retrofittable modular structure includes a core assembly in each of lamp bases for easily securing or removing the electronic control unit through a mechanical securing means, and two sets of connection modules for quickly connecting and disconnecting the electronic control unit with the LED module. The readily retrofittable modular structure may use one bi-pin or two bi-pins to connect to the AC mains via pluggable wire for delivering power to the LEDs. Thus, the LLT lamp using the readily retrofittable modular structure may be configured as single-ended, double-ended, or double-ended with double shock-protection switches and can be cost-effectively retrofitted after initial installation.

6 Claims, 13 Drawing Sheets

LINEAR SOLID-STATE LIGHTING WITH READILY RETROFITTABLE MODULAR STRUCTURE

BACKGROUND OF THE INVENTION

1. Field of the Invention

This invention relates to a linear light-emitting diode (LED) lamp, and more particularly to a linear LED lamp with a readily retrofittable modular structure that enables consumers or manufacturers to readily retrofit, maintain, or upgrade the lamp by replacing an LED module or an internal LED driver. With such a retrofittable modular structure, all the workable parts with specifications that meet market demands can be reused to save resources and to reduce waste on the earth.

2. Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt such a "green" LED lighting for their illumination applications. In this trend, even though no hazardous materials are used in an LED lamp, the lamp material reuse becomes an important environmental issue and needs to be well addressed.

Whereas environmental interest groups persist to urge businesses to pay more attention to their environmental policy, Environmental Protection Agency (EPA) continues to encourage people and businesses to conserve energy, reduce waste, and even lower carbon footprint by recycling and reusing materials. On the LED lamp market, quite a number of so called "green" consumers express preferences for products and firms that are recognized to be more environment-friendly than other competitive products and companies. Such green consumers always check potential LED lamps to see if they are either recyclable or made from interchangeable parts. Besides, some green consumers express their concerns about LED lamps' durability, not just to get one at a cheaper price because they know LED lamps that are more durable and repairable will last longer and therefore produce less garbage in the long run. "Green" investors including individuals and organizations always want to put their money where their environmental values are, especially for solid-state lighting—"green" products based on "green" technologies. In this sense, the linear LED tube lamp manufacturers should make an environmental decision to make their products to be more eco-friendly to be successful.

Although LEDs themselves can operate at least 50,000 hours, the LED driver that operates the LEDs in a linear LED tube (LLT) lamp in most cases cannot last so long because of potential failures of a LED driver in which electrolytic capacitors or other electronic components used are likely to fail prematurely. Upon failure, the LED driver needs to be replaced. But if the LED driver, typically about 10-15% of the cost of an LLT lamp, is not cost-effectively replaceable, then the whole lamp needs to be replaced and becomes waste. However, if the LLT lamp is so designed that internal LED driver can be easily removed and replaced, consumers or manufacturers can replace the LED driver only and not the whole lamp. That way, the manufacturers can reuse all other workable parts with specifications that meet market demands and rebuild the LLT lamp, saving about 85-90% of cost of the lamp with all the workable parts including the LED module, lamp bases, heat sink and housing, lens, and so on.

Furthermore, as LED technologies and standards continue to develop rapidly, requirements of an LED luminous efficacy of 100 lumens per watt and a color rendering index (CRI) of 80 today will be unsatisfactory tomorrow to consumers and the Energy Star program. Market also requires a minimum number of surface mount LEDs used in the LED module and a specific correlated color temperature (CCT) tolerance for LED chips. So, for example, a minimum requirement of 264 LEDs in a 4-ft-T8 LLT lamp and a CCT tolerance of 175 K (Kelvin) today may be obsolete tomorrow. Similarly for LED drivers, requirements of a power factor of 0.9, a total harmonic distortion (THD) less than 20%, and a power consumption of 20 W today may not be good enough tomorrow for energy firms to offer energy rebates, a great incentive for consumers and organizations to adopt LED lamps. In this case, outdated LED modules and LED drivers may need to be replaced with upgraded ones to meet updated consumer needs and new standards.

It is, therefore, the manufacturers' environmental responsibility to design a readily retrofittable LLT lamp such that the redesign efforts are beneficial to lifetime cost of ownership and environmental protection. It seems simple and straightforward, but not single one of manufacturers adopts the idea and builds such products today, whereas an LLT lamp costs only several tens of dollars, and price competition continues to be severe on the market; manufacturers are just trying to produce such LLT lamps at the lowest cost.

To retrofit a conventional LLT lamp for replacing an existing LED driver, one must first remove the two end caps and then cut the AC wires that connect to the AC mains through two opposite bi-pins in the two end caps or de-solder the wires from their respective soldering joints in the two end caps. Then one must disconnect DC wires connected between the LED driver and the LED module by cutting or de-soldering the wires from their respective soldering joints/contacts on the LED PCB (printed circuit board). If the LED driver is not mechanically fixed, then it can be removed immediately after all the wires are released. However, the LED driver should be mechanically secured in an LLT lamp, not relying solely on the electrical contacts, to prevent possible electric shock hazards that occur when any one of the wires is accidentally detached from the soldering joint with the exposed conductor touching the metallic housing. Therefore, Underwriters Laboratories (UL) requires the LLT lamp to meet this consumer safety need. If the LED driver is fixed inside an LLT lamp using a rivet, then one needs to first remove the LED PCB on the upper platform of the lamp housing and then drill the rivet out of the place and then remove the LED driver. The replacement work is tedious and labor intensive; when LED PCB is removed from the platform of the aluminum housing, the LED PCB becomes bent, preventing it from reuse. Thus, no manufacturers would like to replace the LED driver even though the LED driver is broken, but would rather replace the whole lamp, leaving the whole non-operable lamp as a piece of garbage. This kind of products is not eco-friendly and will eventually be rejected by consumers, especially by "green" consumers.

Referring to FIGS. 1 and 2, a conventional LLT lamp 100 comprises a housing 110 with a length much greater than its diameter of 25 to 32 mm, two end caps 120 and 130 with bi-pins 180 and 190 respectively on two opposite ends of the housing 110, LED arrays 140 mounted on a printed circuit board (PCB) 150, and an LED driver 160 used to receive energy from the AC mains, 110 V, 220 V, or 277 VAC, through electrical contacts 142 and the bi-pins 180 and 190, to generate a proper DC voltage with a proper current, and to supply it to the LED arrays 140 such that the LEDs 170 on the PCB 150 can emit light. In some conventional LLT lamps, the LED driver wrapped by an insulation paper or a heat shrinking tube is inserted into the LLT lamp without being mechanically secured. The electrical wires connected to the AC mains may come off from the soldering joints at the electrical contacts 142, which may create a safety issue not acceptable for UL and consumers. Therefore, in some conventional LLT lamps, a rivet (not shown) on the upper platform of the housing is used to secure the LED driver in place under the platform. When the LED PCB is attached on the upper platform of the housing, the rivet can no longer be accessed without first detaching LED PCB from the housing. This means that the LED driver cannot be removed unless the rivet is removed first. Soldering joints 152 and 153 are used to connect the LED driver output DC+ and DC− to the LED arrays. The bi-pins 180 and 190 on the two opposite end caps 120 and 130 connect electrically to the AC mains through two electrical sockets located lengthways in an existing fluorescent tube fixture whereas the two sockets in the fixture connect electrically to the line and the neutral wire of the AC mains, respectively. This is a so called "double-ended" configuration.

To replace a fluorescent tube with an LLT lamp 100, one inserts the bi-pin 180 at one end of the LLT lamp 100 into one of the two electrical sockets in the fixture and then inserts the other bi-pin 190 at the other end of the LLT lamp 100 into the other electrical socket in the fixture. When the line power of the AC mains applies to the bi-pin 180 through one socket, and the other bi-pin 190 at the other end is not yet in the other socket in the fixture, the LLT lamp 100 and the LED driver 160 are deactivated because no current flows through the LED driver 160 to the neutral. However, the internal electronic circuitry is live. At this time, if the person who replaces the LLT lamp 100 touches the exposed bi-pin 190, which is energized, he or she will get an electric shock because the current flows to earth through his or her body—a shock hazard.

Almost all the LLT lamps currently available on the market are without any protections for such electric shock. The probability of getting shock is 50%, depending on whether the person who replaces the lamp inserts the bi-pin first to the line of the AC mains or not. If he or she inserts the bi-pin 180 or 190 first to the neutral of the AC mains, then the LLT lamp 100 is deactivated because the internal circuitry is not live—no shock hazard. An LLT lamp supplier may want to adopt single protection only at one end of an LLT lamp in an attempt to reduce the risk of shock during re-lamping. However, such a single protection approach cannot completely eliminate the possibility of shock risk.

An easy solution to reducing the risk of shock is to connect electrically only one of two bi-pins at the two ends of an LLT lamp to the AC mains, leaving the other bi-pin at the other end of the LLT lamp electrically insulated. Thus, the line and the neutral of the AC mains go into the LLT lamp through the single-ended bi-pin, one for "line" (denoted as L, hereafter) and the other for "neutral" (denoted as N, hereafter). The electrically insulated bi-pin at the other end only serves as a lamp holder to support the LLT lamp mechanically in the fixture. The LLT lamp configured this way is therefore called "single-ended".

In FIG. 3, the AC mains supply voltage to the bi-pin socket 255 in the lamp holder 311 from an end of the LLT lamp 101 leaving the lamp holder 312 electrically insulated—a single ended configuration. Two pins 181 and 182 of the bi-pin are at one end, from which the driver 400 receives energy to power the LED arrays 214. The conductors in the bi-pin socket 255 of the lamp holder 311 are used to connect the bi-pins to the AC mains through electrical contacts shown as dots. The "dot" notation will be used to indicate electrical contacts throughout the figures.

In FIG. 4, the driver 400 receives energy from both bi-pin sockets 255 and 256 in the lamp holders 313 and 314 at opposite ends of the LLT lamp 102 to power the LED arrays 214—a double-ended configuration. The two pins 181 and 182 at one end are internally interconnected with a conductor 253. Similarly, the two pins 183 and 184 at the other end are internally interconnected with a conductor 254. In this case, as long as either one of the two pins 181 and 182 in the bi-pin socket 255 and either one of the two pins 183 and 184 in the bi-pin socket 256 receive power, the LLT lamps can operate.

In the U.S. Pat. No. 8,147,091, issued Apr. 3, 2012, the entirety of which is incorporated herein by reference, double shock protection switches are used in a double-ended LLT lamp to isolate its LED driver such that a leakage current flowing from a live bi-pin, through the LED driver, to an exposed bi-pin is eliminated without shock hazards. FIGS. 5 and 6 illustrate an LLT lamp with such shock protection switches. The LLT lamp 200 comprises a housing 201; two lamp bases 260 and 360, one at each end of the housing 201; two actuation mechanisms 240 and 340 of shock protection switches 210 and 310 in the two lamp bases 260 and 360, respectively; an LED driver 400; and LED arrays 214 on an LED PCB 205. Soldering joints 152 and 153 are used to connect the driver output DC+ and DC− to the LED arrays.

FIG. 6 is a block diagram of an LLT lamp 200 with the shock protection switches 210 and 310. The shock protection switch 210 comprises two electrical contacts 220 and 221 and one actuation mechanism 240. Similarly, a shock protection switch 310 comprises two electrical contacts 320 and 321 and one actuation mechanism 340. The electrical contact 220 in the shock protection switch 210 connects electrically to the bi-pin 250 that connects to the L wire of the AC mains, and the other contact 221 connects to one of the inputs 270 of the LED driver 400. Similarly, the electrical contact 320 in the shock protection switch 310 connects electrically to the bi-pin 350 that connects to the N wire of the AC mains, and the other contact 321 connects to the other input 370 of the LED driver 400. The shock protection switches 210, 310 are normally off. Only after being actuated, will the shock protection switches turn "on" such that they connect the AC mains to the LED driver 400 that in turn powers the LED arrays 214. Serving as gate controllers between the AC mains and the LED driver 400, the shock protection switches 210 and 310 connect the line and the neutral of the AC mains to the two inputs 270 and 370 of the driver 400, respectively. If only one shock protection switch 210 is used at one lamp base 260, and if the bi-pin 250 of this end happens to be first inserted into the live socket at one end of the fixture, then a shock hazard can occur because the shock protection switch 210 already allows the AC power to electrically connect to the driver 400 inside the LLT lamp when the bi-pin 250 is in the socket. Although the LLT lamp 200 is deactivated at the time, the LED driver 400 is live. Without the shock protection switch 310 at the other end of the LLT lamp 200, the driver input 370 connects directly to the bi-pin 350 at the other end of the LLT lamp 200. This presents a shock hazard. However, if the shock protection switch 310 is used in accordance with this application, the current flow to the earth continues to be interrupted until the bi-pin 350 is inserted into the other socket, and the protection switch 310 is actuated. The switch redundancy eliminates the possibility of shock hazard for a person who installs an LLT lamp in the existing fluorescent tube fixture.

Almost all the commercially available LLT lamps today—single-ended, double-ended, or double-ended with double shock-protection switches use wire soldering approach to directly connect the LED driver output to the LED arrays and to directly connect the bi-pins in the end cap to the LED driver inputs. This approach prevents the LED driver used from being easily replaced in the first place. Furthermore, the driver not being mechanically secured may create consumer safety problems whereas the driver being mechanically secured with rivets, screws, or some other improper ways, is even more difficult to be replaced.

SUMMARY OF THE INVENTION

It is an object of the invention to provide a readily retrofittable modular structure for any LLT lamps configured as single-ended, double-ended, or double-ended with shock protection switches so that the internal driver used in such LLT lamps can be replaced as easily as an external driver, which sometimes can be replaced without disassembling the lamp itself in the field. Retrofitting an LED module that comprises LED arrays and the lamp housing is the same as replacing an LED driver. Only difference is that the driver removed is to be reused with an upgraded LED module. This is essential for long-term maintenance and retrofit for linear LED lighting products.

According to the invention, the retrofittable LLT lamp comprises an elongated housing having two ends and a platform on a top side thereof between the two ends; an LED PCB fixed on top of the platform, the LED PCB having LED arrays and at least one first connection module thereon; at least one electronic control unit that controls the power to the LED arrays on the LED PCB, the at least one electronic control unit having two inputs and a second connection module thereon; and two lamp bases respectively connected to the two ends of the housing, each lamp base having an end cover comprising a bi-pin with two pins protruding outwards through the end cover and an intermediate core assembly comprising a securing means used to mechanically couple one electronic control unit and a compartment used to accommodate at least one connection terminal for one AC power pluggable wire.

In an embodiment, at least one electronic control unit is an LED driver. The LED driver is mechanically coupled with a first core assembly through the securing means that comprises a dowel to couple a hole on the LED driver and a platform on the core assembly to partially support the LED driver in a way that when the lamp base is coupled with the lamp housing, the LED driver is pushed into a hollow compartment under the platform of the lamp housing, and the second connection module on the LED driver is automatically coupled with the first connection module on the LED PCB to make a reliable DC power connection. In the single-ended lamp, the AC power connection is done by using two AC pluggable wires plugging onto the connection terminals in the first core assembly in the lamp base. In the double-ended lamp, the AC power connection is done by using two AC pluggable wires plugging onto the connection terminals, each in the first core assembly and a second core assembly in the lamp bases. For the double-ended lamp with double shock protection switches, the AC power connection is done by using two AC pluggable wires plugging onto the connection terminals on the switches, each in the first core assembly and a second core assembly in the lamp bases.

With this readily retrofittable modular structure (readily retrofittable mechanism, thereafter), the linear LED lamp can be cost-effectively retrofitted or upgraded. For example, when the LED driver needs to be replaced, one can remove the lamp base to pull out the LED driver, and at the same time to electrically and mechanically disconnect the LED driver from the LED PCB. Then one can unplug the two AC pluggable wires from the connection terminals in the core assembly/assemblies, depending on single- or double-ended configuration. This way, the LED driver can be taken out from the lamp without cutting or de-soldering any wires. Similarly for installing a new LED driver, one can just follow reverse procedures, no need to make wire connections or to solder any wires. What is most important is that because the AC connection terminals are embedded inside the core assembly/assemblies which are made of an insulated plastic material, and because DC connection between the LED driver and the LED PCB is through the connection modules thereon, AC and DC paths are well separated and insulated; there is no possibility that the AC voltage can mess up in the DC path with a leakage current flowing on the metallic housing, which may create an electric shock hazard for consumers. To prevent consumers from injury due to this shock hazard, UL uses one of the procedures in UL 1993 Standards, Dielectric Voltage-Withstand Test, to determine if LLT lamps under test meet the consumer safety requirements.

Because the readily retrofittable mechanism implemented in the LLT lamp enables consumers or manufacturers to cost-effectively upgrade the LLT lamp without possible misuse of mechanical and electrical connections between the LED PCB and the LED driver and between the LED driver and the AC connection terminals, they are willing to do the upgrade by only replacing the LED driver or the LED module that need to be replaced. Therefore, all the workable parts such as the LED driver, the LED module comprising a plurality of LEDs on the LED PCB, the heat sink or lamp housing, lamp bases, and the lens to be described in detail below can be reused to save resources and to reduce waste on the earth.

DETAILED DESCRIPTION OF THE INVENTION

Figure 1:
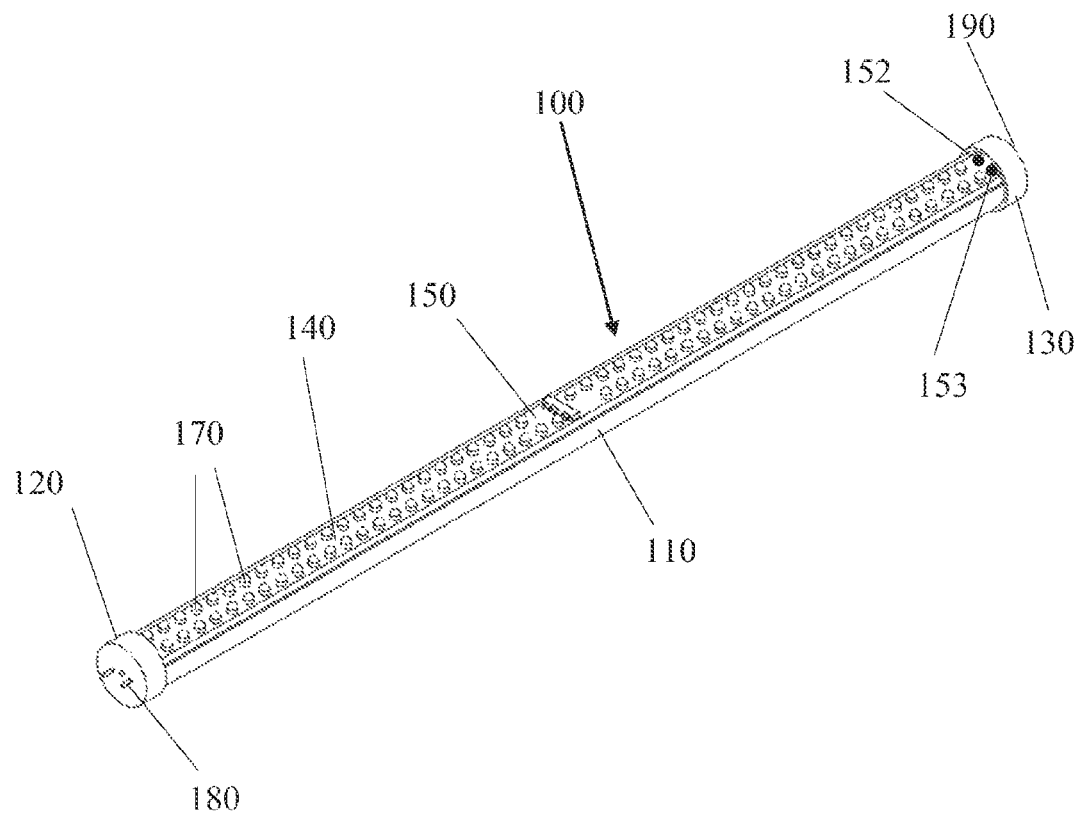
FIG. 1 is an illustration of a conventional LLT lamp.
Figure 2:
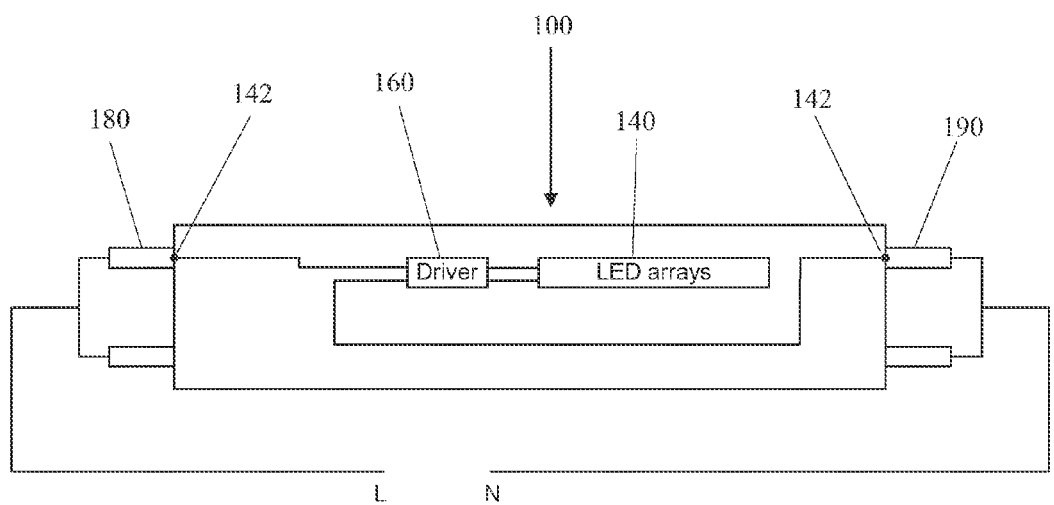
FIG. 2 is a block diagram of a conventional LLT lamp.
Figure 3:
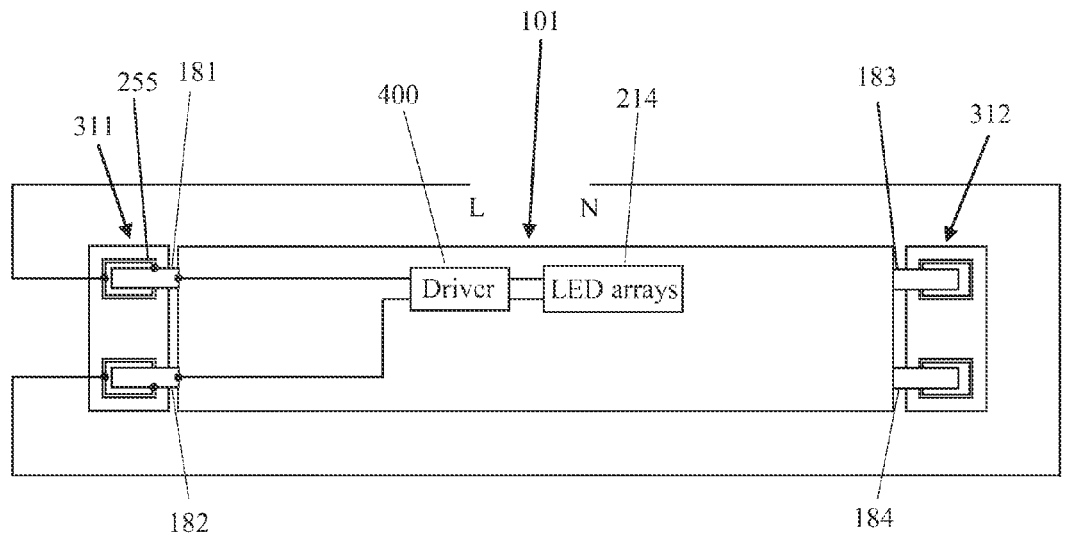
FIG. 3 is a block diagram of a conventional single-ended LLT lamp.
Figure 4:
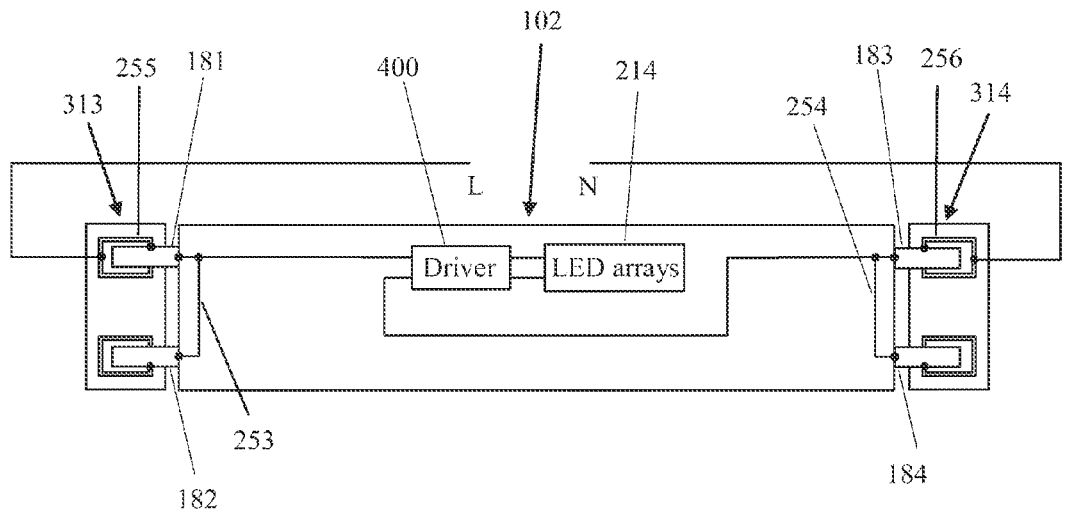
FIG. 4 is a block diagram of a conventional double-ended LLT lamp.

Referring to FIGS. 7, 8, 9, and 14, a core assembly 500 comprises a circular interface ring 501 concentric to the inner wall of an end cover 502, a horizontal channel 503 used to position the core assembly 500 with the aluminum heat sink housing 802 (in FIG. 14) by embedding an end of platform 803 (in FIG. 14) of the heat sink housing 802 into the channel 503, a supporting surface 510 to support an LED driver 600 (in FIG. 14), a mechanical securing means 511 on the supporting surface 510 to hold and secure the LED driver 600, a bi-pin 509 for connecting to a socket for an LLT lamp, a hollow compartment 513 under the supporting surface 510 for holding the AC connection terminals 514 (in FIG. 9) and a lead wire (not shown) that electrically connects to a bi-pin 509, and two holes 512 each for accommodating an AC power pluggable wire 515 inserted and connected to one of the AC connection terminals 514. The supporting surface 510 on the core assembly 500 should be long enough to partially support the LED driver and be protruded in a way that it can be partially inside the lamp housing under the platform 803 when the lamp base 550 that includes the end cover 502 is connected to the lamp housing 802. On the supporting surface 510, the mechanical securing means 511 used is a dowel, which can be replaced with two or more dowels. Other possibilities for holding and securing the LED driver 600 include a tap hole with a fixing screw, a retaining clip, or other similar means. In this embodiment, the LED driver 600 is held and secured by using the mechanical securing means 511 in one of two lamp bases. Other electronic control units including a dimming control unit or a ZigBee controller may be attached to the other lamp base by the same mechanical securing means 511.

Introducing an intermediate core assembly 500 to interface the end cover 502 and the lamp housing 802 offers another advantage which a person having ordinary skill in the art always ignore. The end cover 502 contains an outward bi-pin that connects to the AC mains, and the inner side of the end cover 502 unavoidably has exposed live traces or connection joints. Without the plastic core assembly which is insulated as an interface, when the end cover 502 and the heat sink housing 802 are connected, the live traces or the connection joints may contact the metallic heat sink and short—an electric shock hazard. So the intermediate core assembly 500 also serves as a buffer intended to physically limit access to live parts that pose a risk of electric shock. Thus, with the intermediate core assembly 500 in place, retrofitting an LLT lamp can be straightforwardly done by a consumer without any safety concern.

Figure 8:
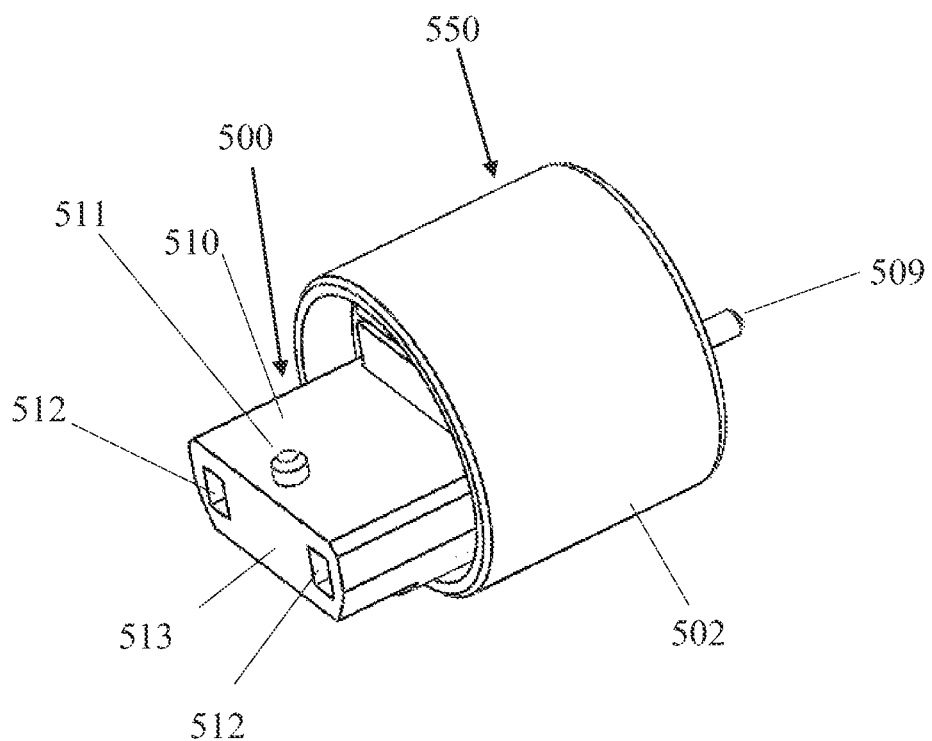
FIG. 8 is a perspective view of a lamp base comprising the core assembly according to the present invention.
Figure 9:
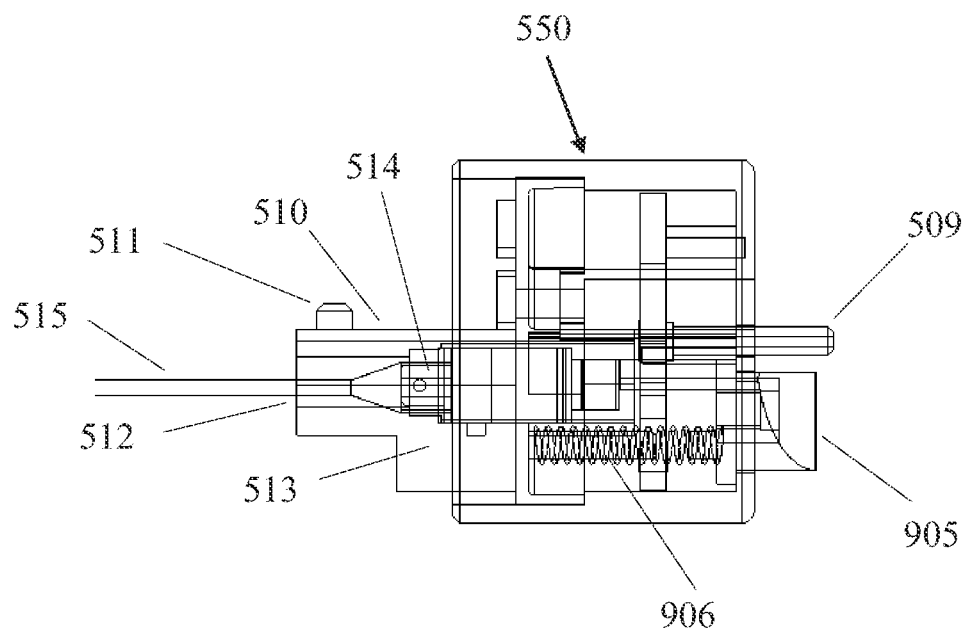
FIG. 9 is a side view of a lamp base comprising the core assembly and a pluggable wire according to the present invention.

In FIG. 8, the core assembly 500 is coupled with the end cover 502 to form a lamp base 550 by the concentric interface ring 501 (in FIG. 7) and an internal positioning means in the end cover 502. In FIG. 9, the AC power pluggable wire 515 is further inserted into one of the holes 512 and connected to one of the AC connection terminals 514 in the hollow compartment 513. The other end of the AC power pluggable wire 515 is connected to one of the inputs of the LED driver 600. After installing the AC power pluggable wire 515 and an LED driver, one can install the lamp base 550 by using screws to secure the end cover 502 and the core assembly 500 through the screw holes (not shown) in the end cover 502 and the screw holes 504 (in FIG. 7) in the core assembly 500 all the way to the end of an LLT lamp 900 (in FIG. 14).

For the single-ended application, two holes 512 and two connection terminals 514 are needed for two AC power pluggable wires 515 to connect to the AC mains because the power is delivered from the bi-pin at the same lamp end. For the double-ended application, one of the holes 512 and one of the connection terminals 514 in each lamp base at opposite end are used to connect to the AC mains because the power is delivered from the bi-pins at the two opposite lamp ends. For the double-ended application with double shock-protection switches, the connections are the same as the double-ended application. Only difference is that the AC power pluggable wire 515 is connected to the connection terminals 514 on a shock protection switch (in FIG. 9) in the core assembly 500. The shock protection switch of each of the lamp bases comprises at least two electrical contacts, one electrically connected to the bi-pin of the lamp base and the other electrically connected to one of the inputs of the LED driver, now through the connection terminals 514; and at least one switch actuation mechanism 905 (shown in FIG. 9) having a front portion protruding outwards through the end cover of the lamp base, wherein when the front portion of the switch actuation mechanism is actuated by inserting the bi-pin of the lamp base into a lamp socket, the two electrical contacts are electrically connected to actuate the shock protection switch so that the bi-pin is electrically connected with one of the inputs of the LED driver. Spring 906 in FIG. 9 is used to provide a stretching force for the switch actuation mechanism 905 to keep deactivated so that the shock protection switch is maintained an off-state when the lamp is not in the fixture and during relamping.

In the above embodiment, only one electronic control unit which is the LED driver is used. Two electronic control units may be used with the two core assemblies at the opposite ends of the lamp, taking the same advantage of being readily retrofitted. The electronic control units that may be used in this case include the LED driver, a dimming control unit, a ZigBee controller, or an LED driver in part. The LED driver in part means that the LED driver may be divided into two parts installed respectively in the two core assemblies at the opposite ends of the lamp for another purposes.

Figure 10:
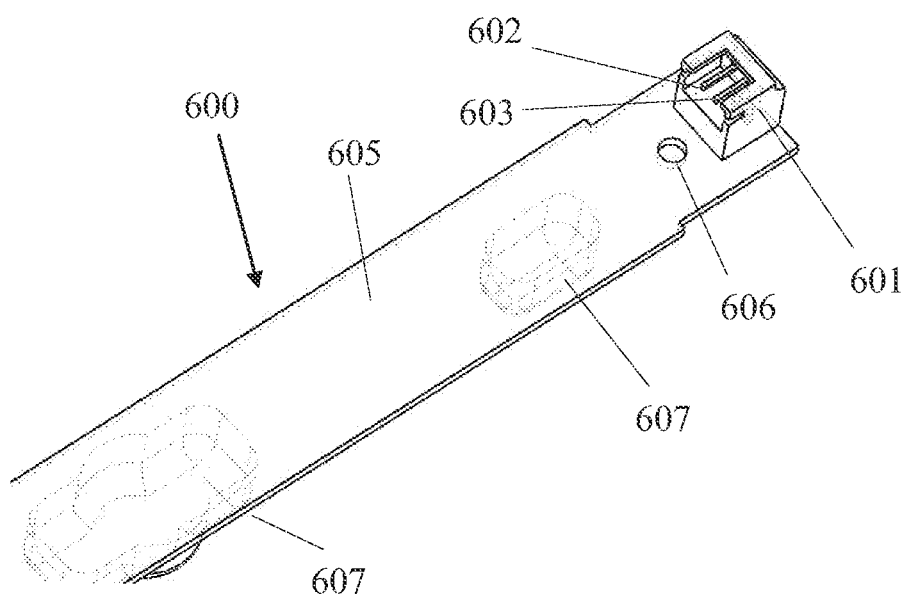
FIG. 10 is a perspective view of a connection module in an LED driver according to the present invention.

Referring to FIGS. 10, 11, 12, and 13, the second connection module 601 in an LED driver 600 is used to electrically connect to an LED lighting board 700 through the first connection module 701 on the LED PCB 707. Two connection pins 602 and 603 in the second connection module 601 are used to couple with two connection slots 702 and 703 (not shown) on the back of the first connection module 701 on the LED lighting board 700. In FIG. 10, a hole 606 on the LED driver PCB 605 is used to couple with the dowel 511 on the core assembly 500 in the lamp base 550 and to mechanically secure the LED driver 600 with the support of the supporting surface 510 on the core assembly 500 in the lamp base 550 so that when the lamp base 550 is mechanically connected with the lamp housing 802, the LED driver 600 is pushed into the bottom compartment 804 of the lamp housing 802, whereas when the lamp base 550 is removed from the lamp housing 802, the LED driver 600 is pulled out from the bottom compartment 804 of the lamp housing 802 and can then be easily removed from the dowel 511 on the core assembly 500 in the lamp base 550. The hole 606 on the LED driver PCB 605 can also be used with the tap hole (the position of the dowel 511) on the core assembly 500 in the lamp base 550 to mechanically secure the LED driver 600 with a fixing screw. Another possibility is that the hole 606 on the LED driver PCB 605 is used with the retaining clip on the core assembly 500 in the lamp base 550 to grip the LED driver 600 in place.

Figure 11:
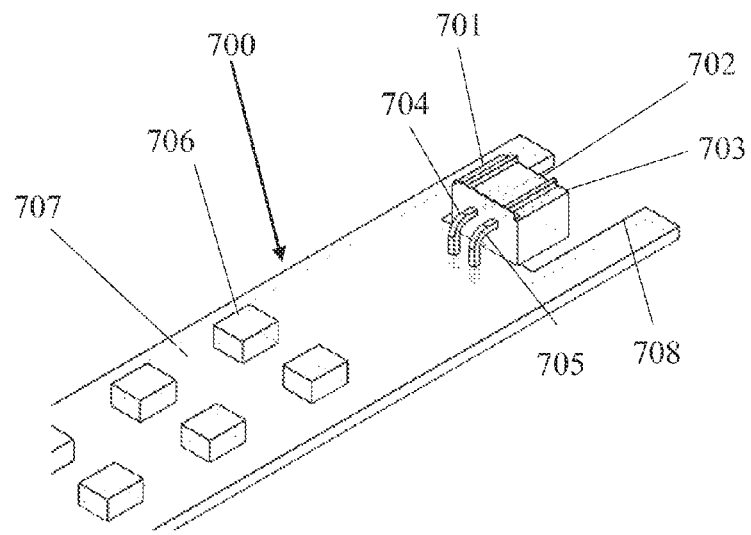
FIG. 11 is a perspective view of a connection module in an LED lighting board according to the present invention.
Figure 12:
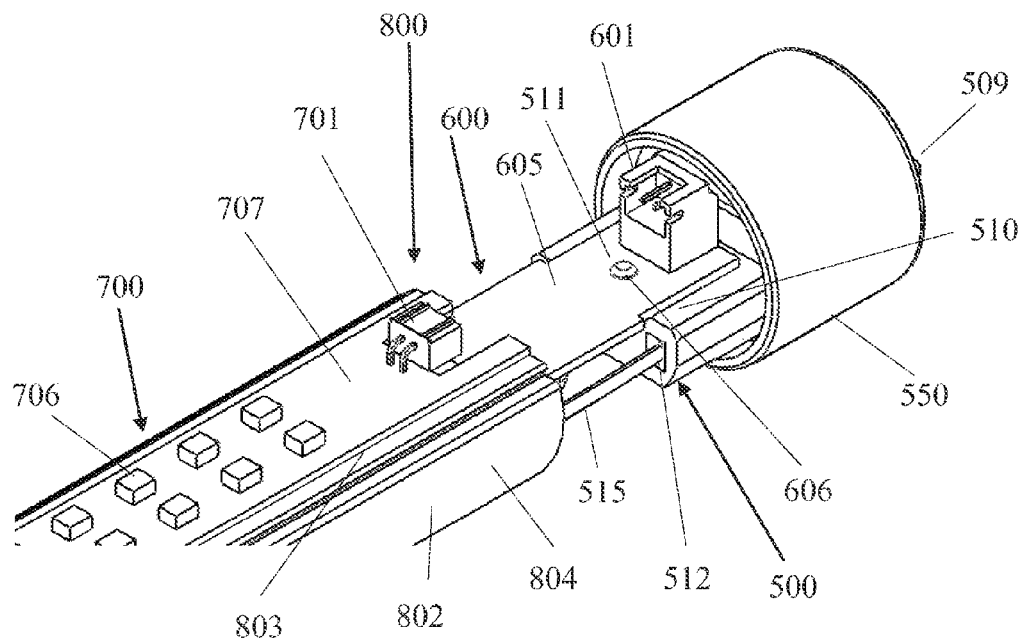
FIG. 12 is a perspective view of an embodiment of the readily retrofittable mechanism before the lamp base is coupled to an LLT lamp according to the present invention.

In FIG. 11, a cutout 708 on the LED PCB 707 is used to guide and accommodate the width of the second connection module 601 on the LED driver 600. The first connection module 701 is mounted along an edge of the cutout 708 with the pins 704 and 705 soldered on the LED PCB 707. In FIG. 12, the LED lighting board 700 is fixed on top of the platform 803 of the housing 802 whereas the LED driver 600 is inserted into the hollow bottom compartment 804 under the platform 803. The platform 803 has a similar cutout as the cutout 708 to accommodate the width of the second connection module 601. The LED PCB 707 and the driver PCB 605 are not in the same plane. So one of the challenges is how to precisely couple the two connection modules 601 and 701 such that the two connection pins 602 and 603 in the second connection module 601 can be three-dimensionally coupled with two connection slots 702 and 703 on the back of the first connection module 701 in the LED lighting board 700. The cutout 708 provides a horizontal guiding in the first place followed by the use of the pins 704 and 705 soldered on the LED PCB 707 to provide a vertical flexibility. In combination, they can offer enough tolerance of mechanical precision and make mechanical coupling and electrical connections easier and faster, thus reducing retrofit cost. That is, when the second connection module 601 on the LED driver 600 is pushed into the first connection module 701 on the LED lighting board 700, the two connection pins 602 and 603 in the second connection module 601 and the connection slots 702 and 703 on the back of the first connection module 701 are mated so that mechanical coupling and electrical connections can be made in the shortest period of time. This is essential for cost-effective LED driver replacement. After assembling, the two connection modules 601 and 701 are coupled with electrical connections automatically made—no lead wires or wire soldering needed. This completely eliminates electrical wire management in the small lamp base area. Furthermore, the LED lighting board 700 and the LED driver 600 are respectively disposed on top and bottom of the platform 803 of the housing 802, separated by the platform 803. If there is a wire interconnection between the LED lighting board 700 and the LED driver 600, the wires must cross the platform 803 to make an electrical connection. It is possible that part of the wires is squeezed between the lamp base 550 and the cross section of the platform 803 when the lamp base 550 is fixed on the lamp housing, leading to broken wires. On the other hand, when the lamp base 550 is removed from the lamp housing 802, the LED driver 600 is pulled out from the bottom compartment 804 of the lamp housing 802, and at the same time, the second connection module 601 in the LED driver 600 is decoupled from the first connection module 701 in the LED lighting board 700, automatically disconnecting the electrical connection between the LED driver 600 and the LED lighting board 700—no wire cutting or de-soldering is needed.

In FIG. 12, when assembling an LLT lamp 800, the AC power pluggable wire 515 must be first inserted into the hole 512 and then plugged onto the connection terminal 514 in the core assembly 500 in the lamp base 550. The other end of the AC power pluggable wire 515 can be soldered to the LED driver 600 or be connected with a connector on the LED driver 600 to make an AC connection. In disassembling the LLT lamp 800, when the lamp base 550 is removed from the lamp housing 802, the AC power pluggable wire 515 can be accessed and removed from the connection terminal 514 in the core assembly 500 in the lamp base 550, and then the LED driver 600 can be immediately removed and replaced.

Figure 13:
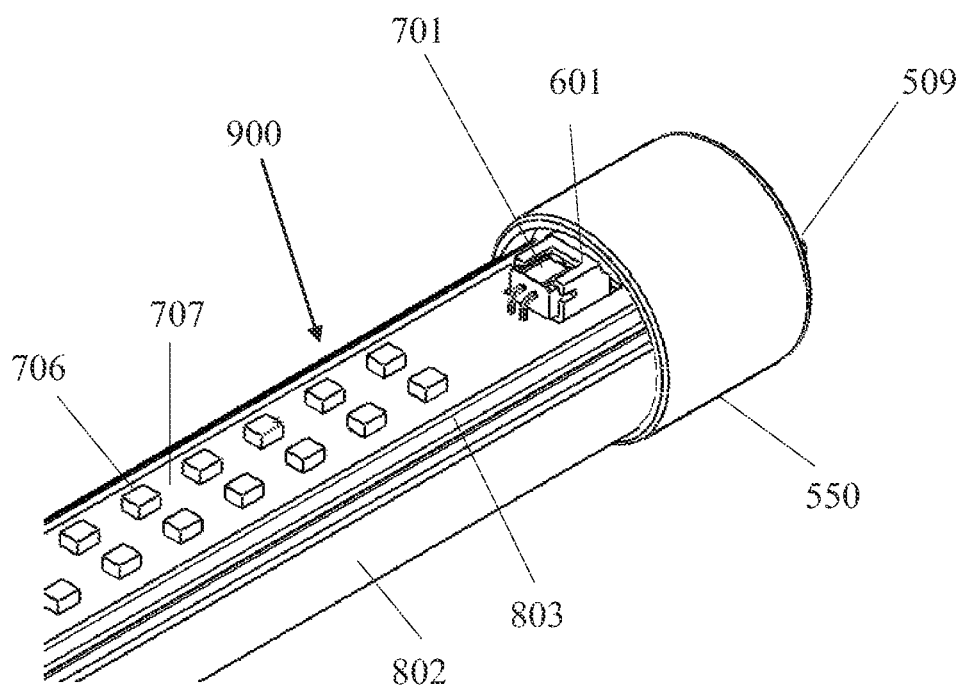
FIG. 13 is a perspective view of an embodiment of the readily retrofittable mechanism after the lamp base is coupled to an LLT lamp according to the present invention.
Figure 14:
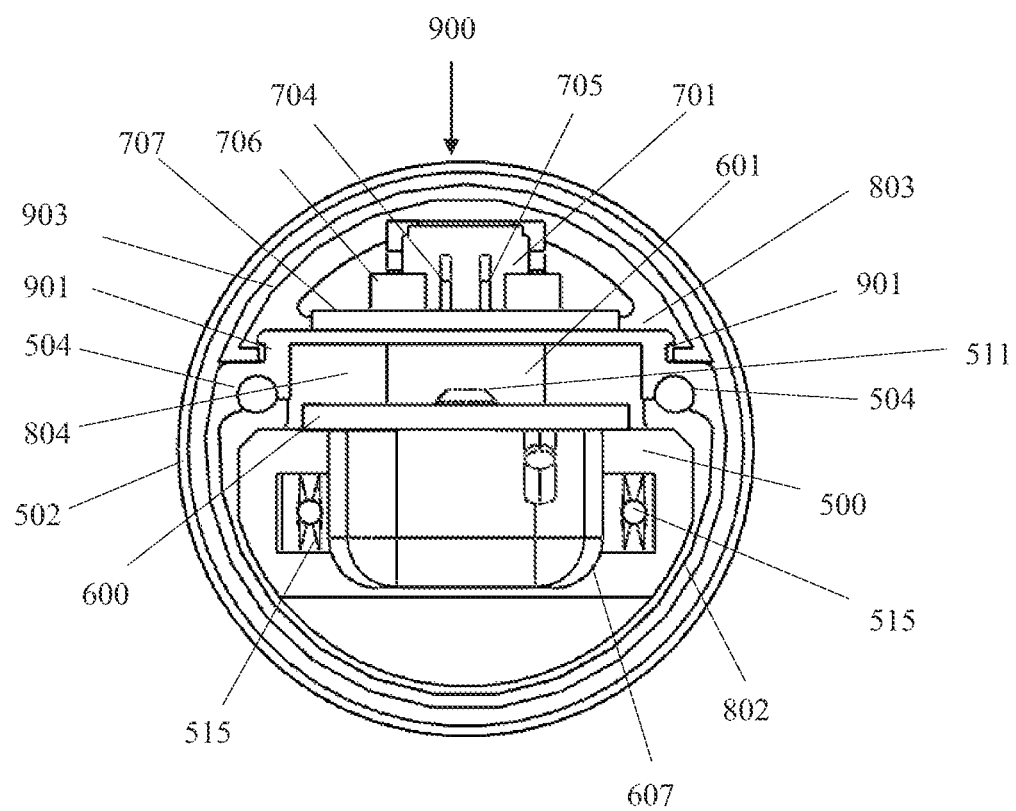
FIG. 14 is a cross-sectional view of an embodiment of the readily retrofittable mechanism in an LLT lamp according to the present invention.

FIG. 13 is a perspective view of an embodiment of a readily retrofittable mechanism after the lamp base 550 is coupled to an LLT lamp 900 with a lens (not shown for clarity). FIG. 14 is a cross-sectional view of the LLT lamp 900 that adopts the readily retrofittable mechanism. As shown in FIGS. 13 and 14, the elongated lamp housing 802 made of aluminum is served as a heat sink of the lamp. On the platform 803 of the lamp housing 802 is an LED PCB 707 whereon the LED arrays 706 are mounted. In the hollow bottom compartment 804 under the platform 803, the LED driver 600 is secured on the dowel 511 (with the dowel 511 inserted through the hole 606) on the core assembly 500 in the lamp base 550 when the lamp base 550 is coupled to an end of the lamp housing 802. The LED driver 600 is mounted in such a way that the electronic components 607 thereof on the LED driver PCB 605 face downward. Depending on the lamp configurations—single-ended, double-ended, or double-ended with double shock-protection switches, the AC power pluggable wires 515 connect differently to the connection terminals 514 in the core assembly 500 in the lamp base 550. For example, in the single-ended application, two AC power pluggable wires 515 are used at a single lamp base, leaving the other lamp base electrically insulated. In the double-ended application, the two AC power pluggable wires 515 are used separately in two lamp bases at two opposite ends of the lamp. For the double-ended application with double shock-protection switches, the connections are the same as those in the double-ended application except that the AC power pluggable wires 515 are connected to the connection terminals 514 on the shock protection switches in the lamp bases at the two opposite ends of the lamp. On each of the two end covers 502 are two screw holes for the two lamp bases 550 to be fixed on the lamp housing 802 to form a complete lamp. On the lamp housing 802 along two longitudinal sides of the platform 803 are two elongated troughs 901 to secure the lens 903, through which the LED arrays emit the light to the ambient. The installation and removal of the lens 903 should be easy because of this trough design. On the LED PCB 707, the connection module 701 is coupled with the connection module 601 in the LED driver 600.

Figure 5:
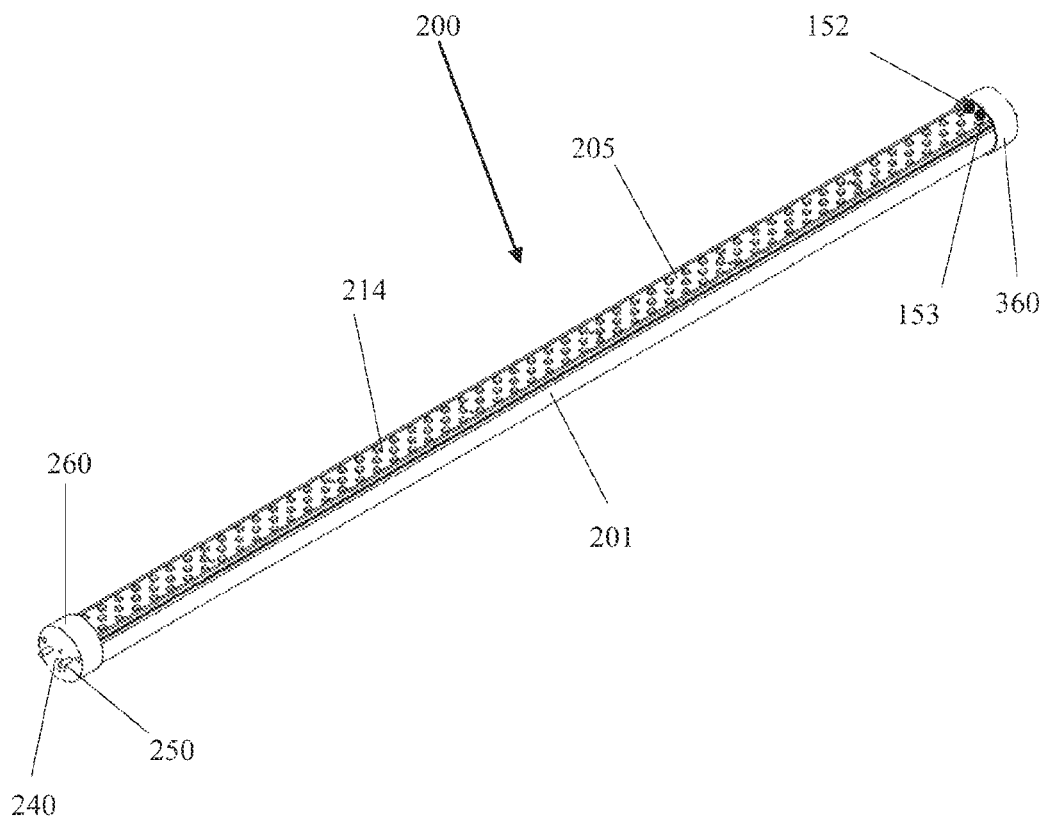
FIG. 5 is an illustration of a double-ended LLT lamp with shock protection switches.
Figure 6:
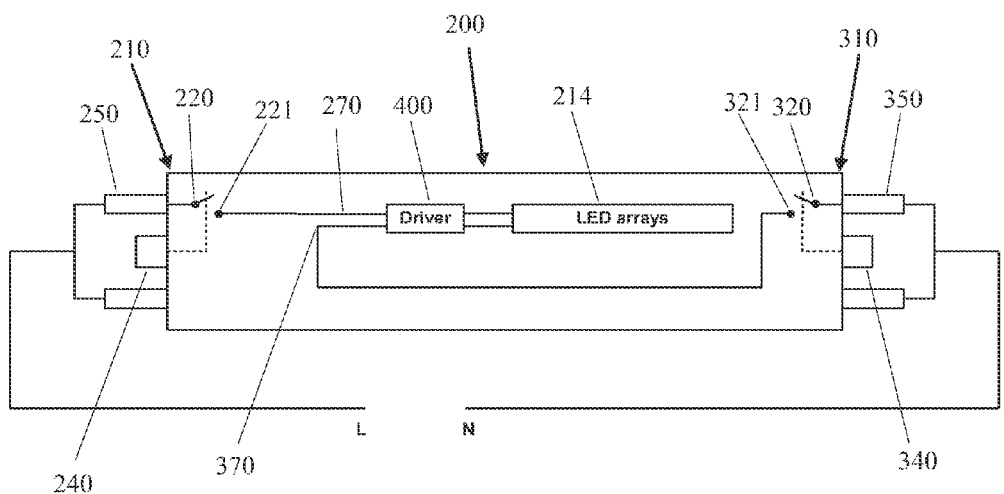
FIG. 6 is a block diagram of a double-ended LLT lamp with shock protection switches.
Figure 7:
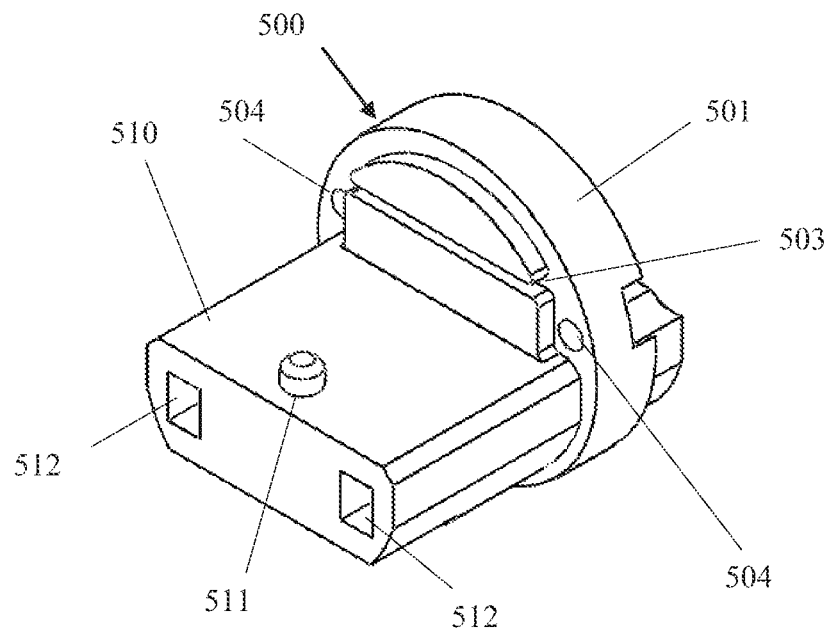
FIG. 7 is a perspective view of a core assembly in a lamp base according to the present invention.
Figure 15:
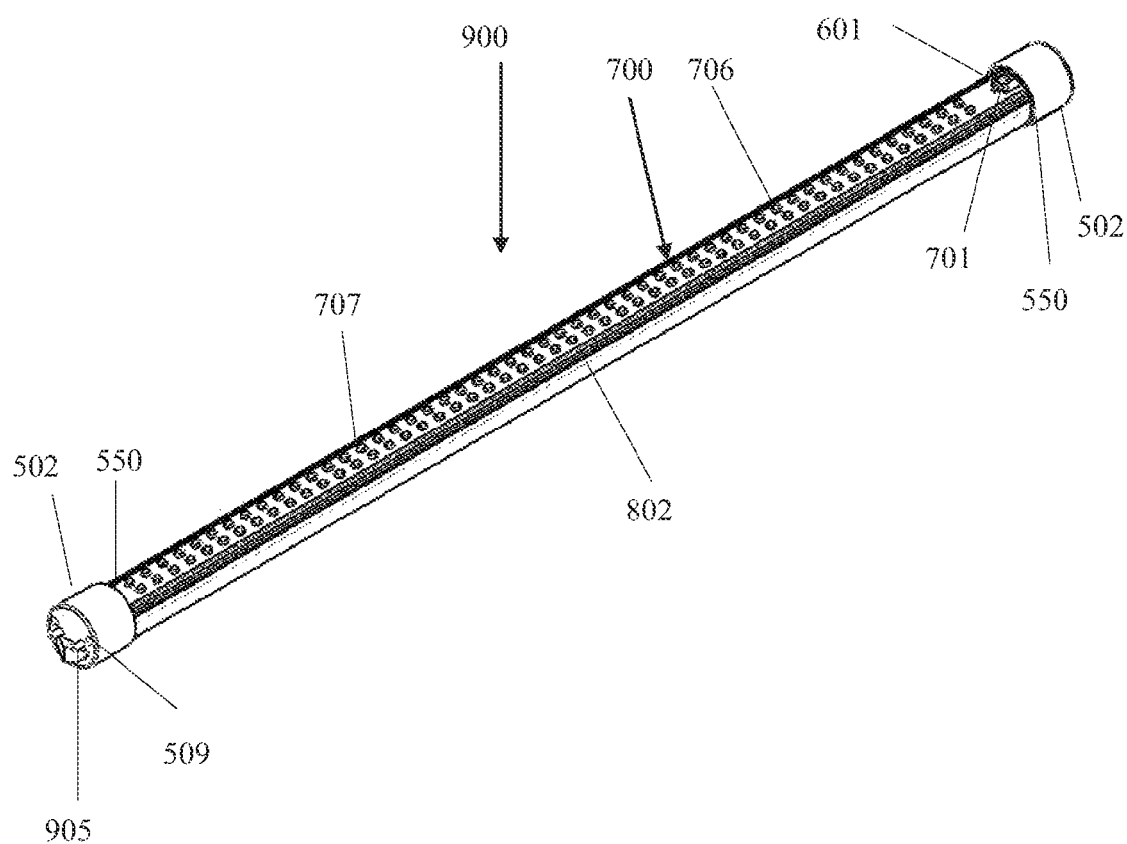
FIG. 15 is a perspective view of a double-ended LLT lamp with shock protection switches and with the readily retrofittable mechanism according to the present invention.
Figure 16:
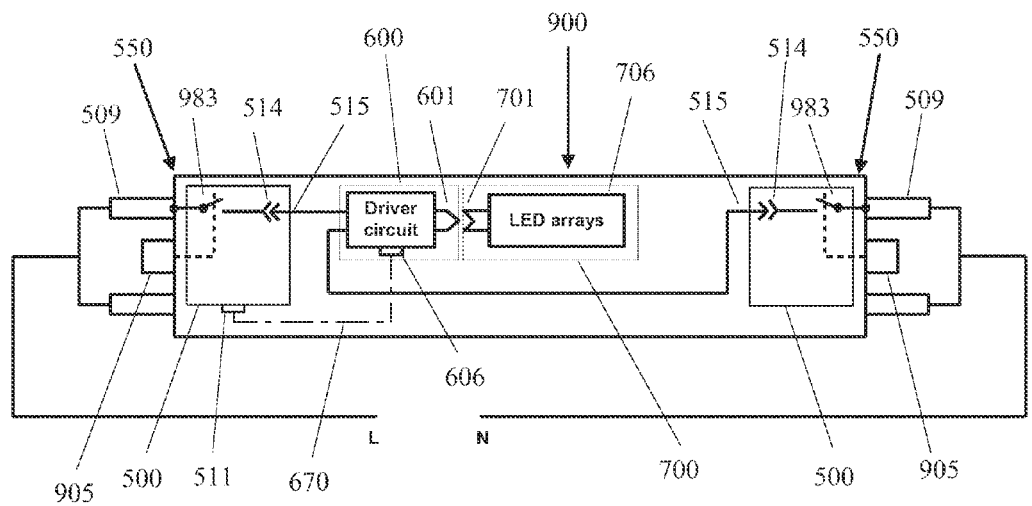
FIG. 16 is a block diagram of a double-ended LLT lamp with shock protection switches and with the readily retrofittable mechanism according to the present invention.

FIG. 15 is a perspective view of an LLT lamp 900 that adopts a readily retrofittable mechanism with a lens (not shown for clarity). FIG. 16 is a block diagram of a double-ended LLT lamp 900 with shock protection switches and the readily retrofittable mechanism. Referring to FIGS. 15 and 16, the lamp 900 is for double-ended application with double shock-protection switches in both lamp bases 550, in which two switch actuation mechanisms 905 are shown. The soldering joints 152 and 153 on the LED PCB 205 (as shown in FIG. 5) are replaced with a combination of the connection modules 601 and 701 electrically connected to deliver DC power from the LED driver 600 to the LED PCB 707 for LED arrays 706 to emit light. Two lamp bases 550 are respectively attached to the two ends of the LLT lamp housing 802 to form the lamp 900 as a stand-alone lighting device. Each lamp base 550 has an end cover 502 comprising a bi-pin with two pins 509 protruding outwards through the end cover, and the core assembly 500 comprising a mechanical securing means (such as a dowel 511) to secure the LED driver 600, wherein: when the lamp base 550 with the core assembly 500 with the LED driver 600 secured thereon is fixed to the LLT lamp housing 802 on which the LED PCB 707 is fixed, the LED lighting board 700 (or LED PCB 707) is electrically connected to the LED driver 600 through the linkage 670 of the mechanical securing means (namely, by mating between the dowel 511 and the hole 606 in the LED driver 600). In FIG. 16, two shock protection switches 983, one each in the two core assemblies 500, are shown. Two pluggable wires 515 connecting the LED driver 600 to the connection terminals 514 on the shock protection switches 983 are also shown. Therefore, as the AC power is delivered to the lamp 900 with the shock protection switches 983 actuated, the LED arrays 706 can emit light.

Figure 17:
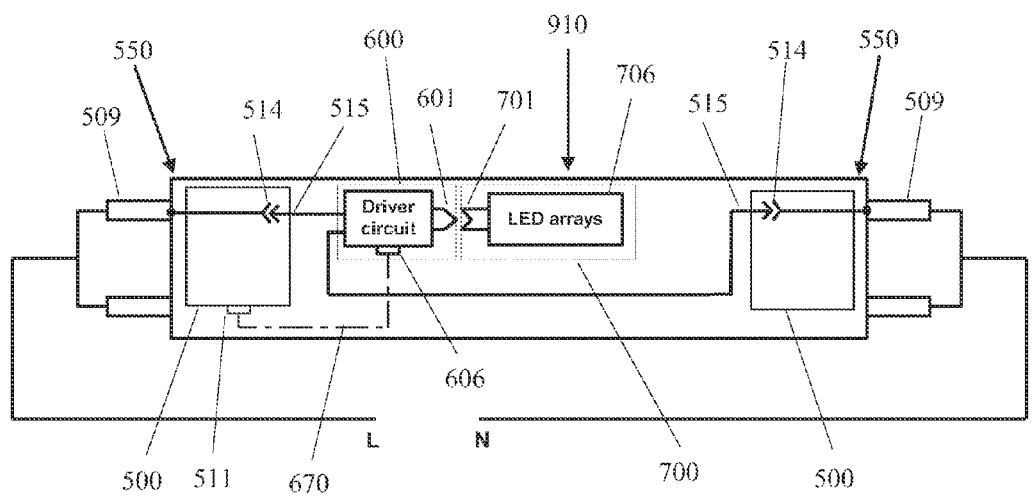
FIG. 17 is a block diagram of a double-ended LLT lamp with the readily retrofittable mechanism according to the present invention.

FIG. 17 is a block diagram of a double-ended LLT lamp 910 adopting the readily retrofittable mechanism. The functions are almost the same as the double-ended LLT lamp 900 with shock protection switches except that the shock protection switches 983 are not used in the double-ended LLT lamp 910. Two core assemblies 500 are included, one each in the two lamp bases 550 for one connection terminal 514 to be secured therein. The AC power pluggable wires 515 can be easily plugged onto the connection terminal 514 through the hole 512 of each core assembly 500 and make electrical connections so that the AC power can be delivered.

Figure 18:
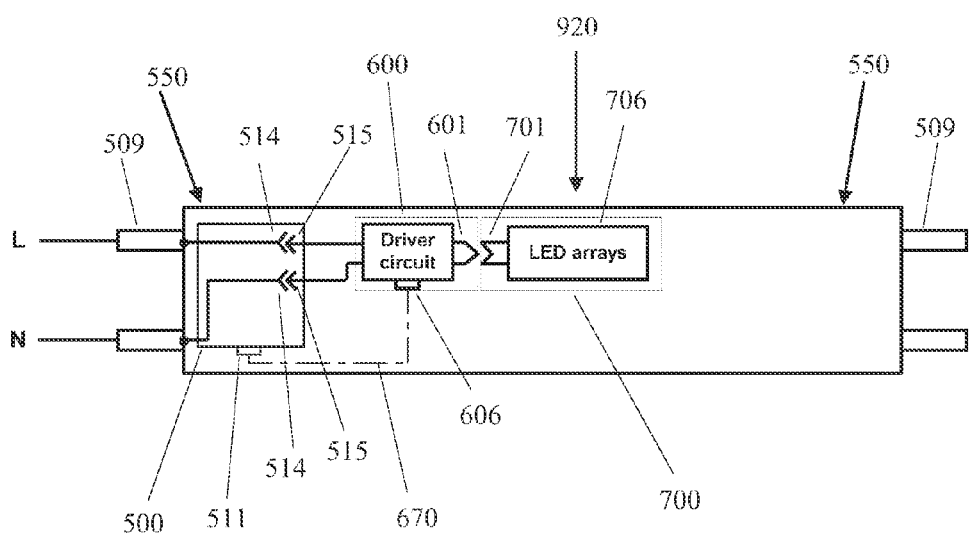
FIG. 18 is a block diagram of a single-ended LLT lamp with the readily retrofittable mechanism according to the present invention.

FIG. 18 is a block diagram of a single-ended LLT lamp 920 adopting the readily retrofittable mechanism. The functions are almost the same as the double-ended LLT lamp 900 except that the power is delivered from one bi-pin at one of the two ends of the lamp 920. In this case, the only core assembly 500 have two connection terminals 514 secured therein for the AC power pluggable wires 515 to be easily plugged in and make an electrical connection with the two connection terminals 514 so that the AC power can be delivered.

Whereas preferred embodiments of the invention have been shown and described, it will be realized that alterations, modifications, and improvements may be made thereto without departing from the scope of the following claims. Another readily retrofittable mechanism in an LLT lamp using various kinds of combinations to accomplish the same or different objectives could be easily adapted for use from the present invention. Accordingly, the foregoing description and attached drawings are by way of example only, and are not intended to be limiting.

What is claimed is:

1. A linear light-emitting diode (LED) tube lamp, comprising:
   a housing having two ends and a platform between the two ends;
   a light-emitting diode printed circuit board (LED PCB) fixed on top of the platform, the LED PCB having a plurality of LEDs and a first connection module fixed thereon;
   an LED driver for powering the plurality of LEDs on the LED PCB, the LED driver having two inputs, an LED driver PCB, and a second connection module fixed on the LED driver PCB; and
   a first and a second lamp bases for respectively fixing to the two ends of the housing, each lamp base having an end cover comprising a bi-pin with two pins protruding outwards through a side of the end cover, and a core assembly, wherein the bi-pin of each lamp base is electrically connected to one of the two inputs of the LED driver through the core assembly,
   wherein the core assembly of the first lamp base further comprises a mechanical securing means for securing the LED driver in place;
   wherein:
   when the first lamp base with the LED driver secured by the mechanical securing means is fixed to the housing, the second connection module is directly coupled with the first connection module so that the LED driver PCB is electrically connected to the LED PCB; and
   when the first lamp base with the LED driver is separated from the housing, the two connection modules are uncoupled and the LED driver PCB is electrically disconnected from the LED PCB.

2. The linear LED tube lamp of claim 1, wherein when the first lamp base with the LED driver secured by the mechanical securing means is fixed to the housing, the first connection module and the second connection module are directly coupled through mating of the two connection modules.

3. The linear LED tube lamp of claim 1, wherein the core assembly of each of the lamp bases further comprises an AC power connection terminal, and the bi-pin of each lamp base is electrically connected to the AC power connection terminal that is electrically connected via a wire to one of the inputs of the LED driver.

4. The linear LED tube lamp of claim 3, wherein each AC power connection terminal is disposed in a hole of the respective core assembly, and the wire is pluggable to the hole of the respective core assembly to make contact with the AC power connection terminal.

5. The linear LED tube lamp of claim 1, wherein the mechanical securing means is a dowel or a tap hole with a fixing screw, and the LED driver PCB has a matching hole for coupling with the dowel or the fixing screw.

6. The linear LED tube lamp of claim 1, wherein the mechanical securing means is a retaining clip, and the LED driver PCB has a hole for holding the retaining clip.

* * * * *